C. MUEHLEISEN & C. A. ALBRECHT.
APPARATUS FOR PRODUCING PERFORATED STRIPS FOR CONTROLLING SELECTIVELY OPERATED MACHINES.
APPLICATION FILED OCT. 6, 1916.

1,251,407.

Patented Dec. 25, 1917.
8 SHEETS—SHEET 1.

C. MUEHLEISEN & C. A. ALBRECHT.
APPARATUS FOR PRODUCING PERFORATED STRIPS FOR CONTROLLING SELECTIVELY OPERATED MACHINES.
APPLICATION FILED OCT. 6, 1916.

Patented Dec. 25, 1917.
8 SHEETS—SHEET 2.

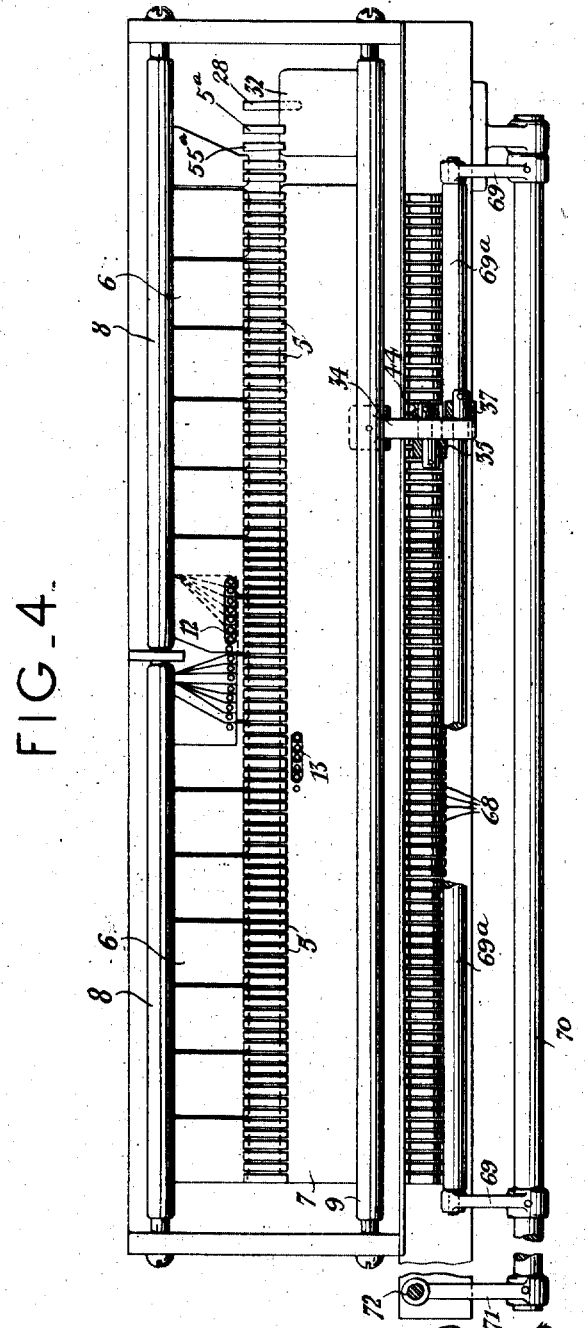

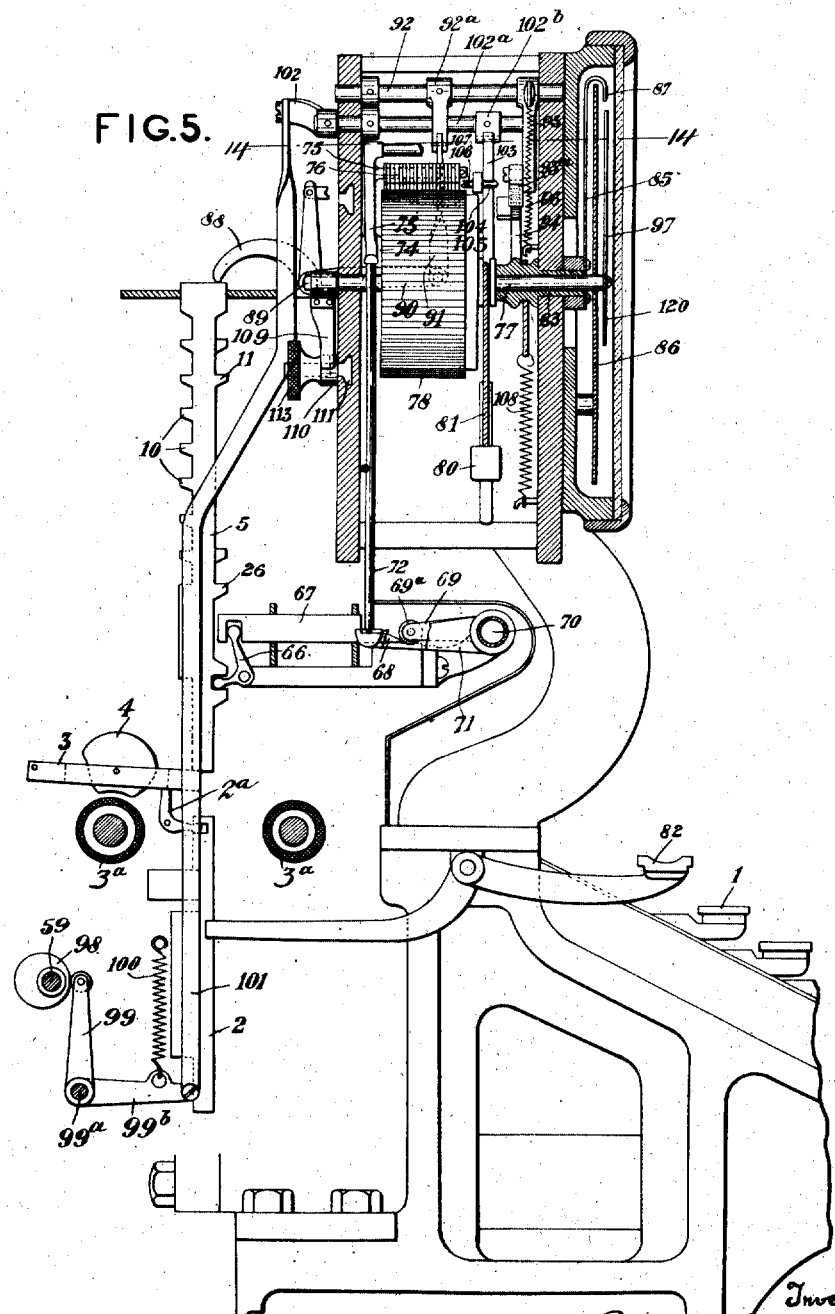

C. MUEHLEISEN & C. A. ALBRECHT.
APPARATUS FOR PRODUCING PERFORATED STRIPS FOR CONTROLLING SELECTIVELY OPERATED MACHINES.
APPLICATION FILED OCT. 6, 1916.
1,251,407.
Patented Dec. 25, 1917.
8 SHEETS—SHEET 5.
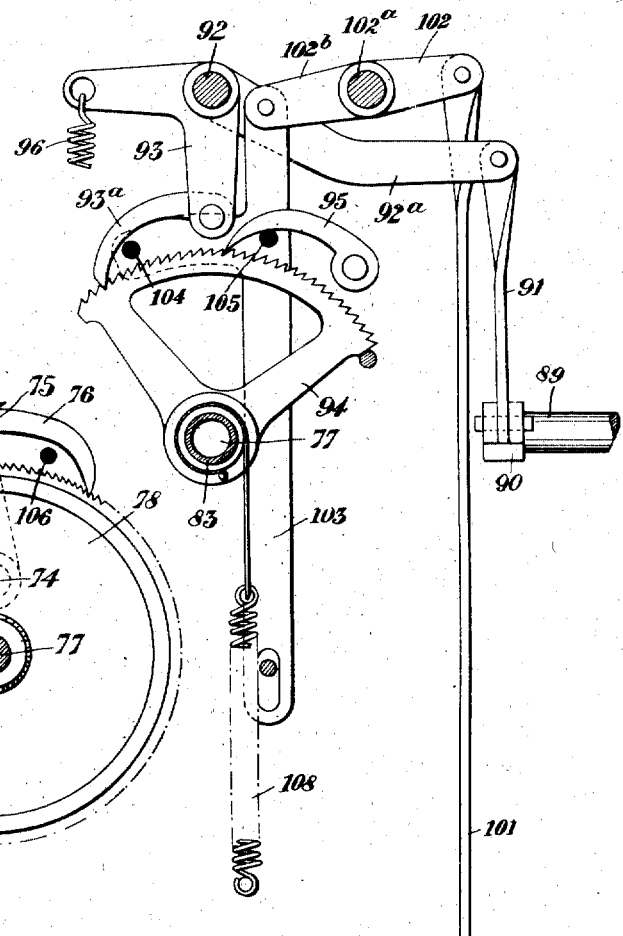
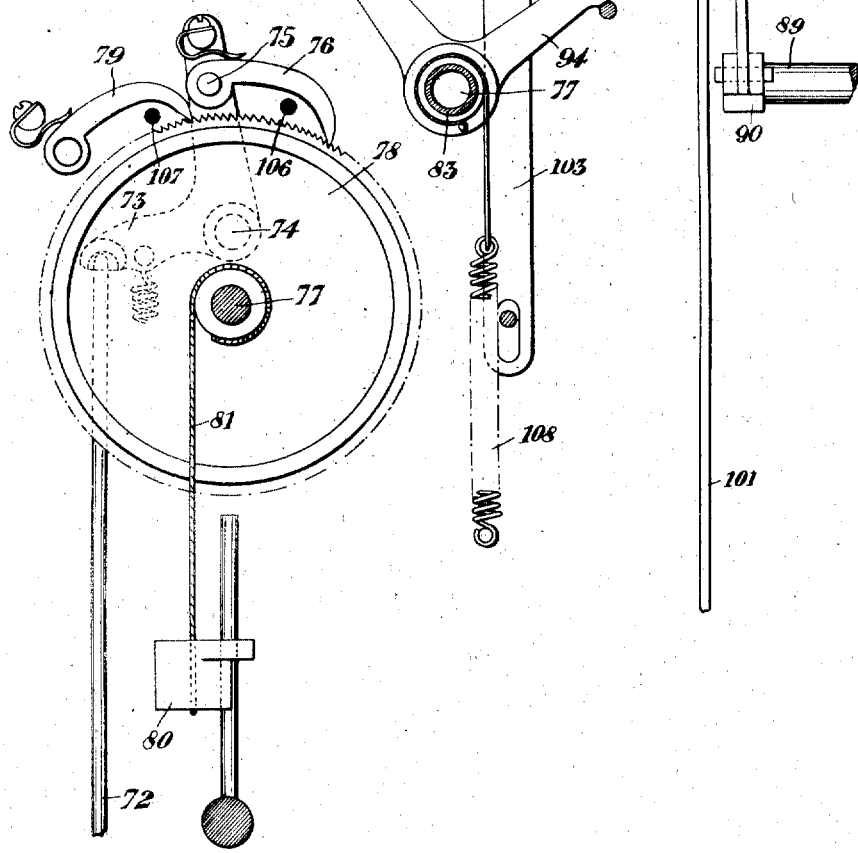

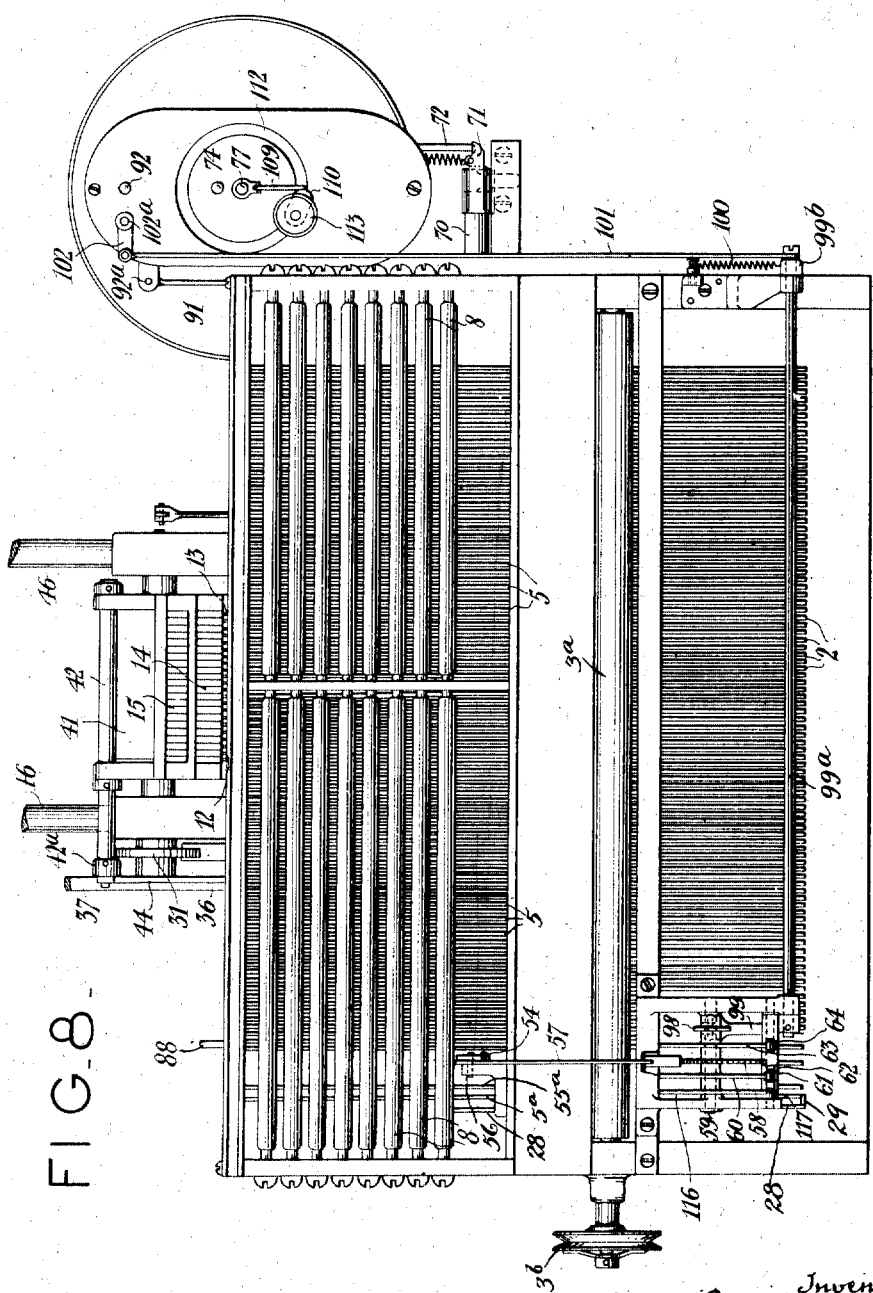

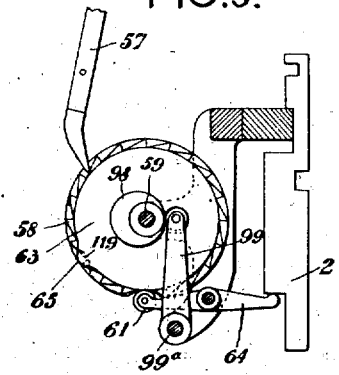
FIG.9.
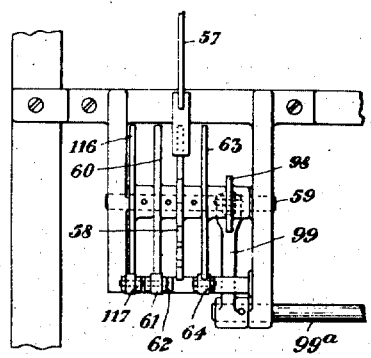
FIG.10.
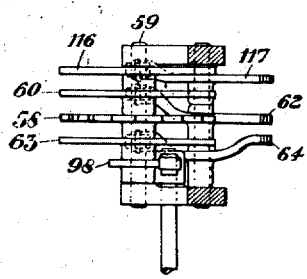
FIG.11.
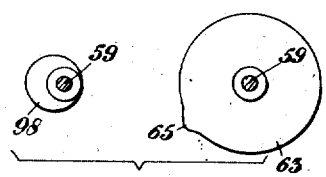
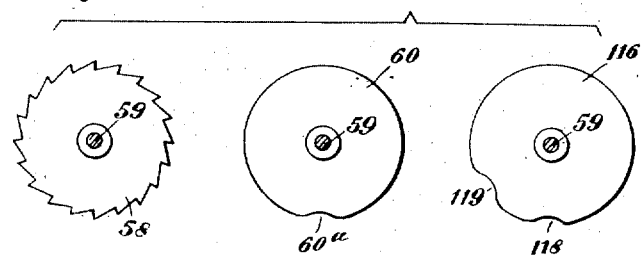
FIG.12.

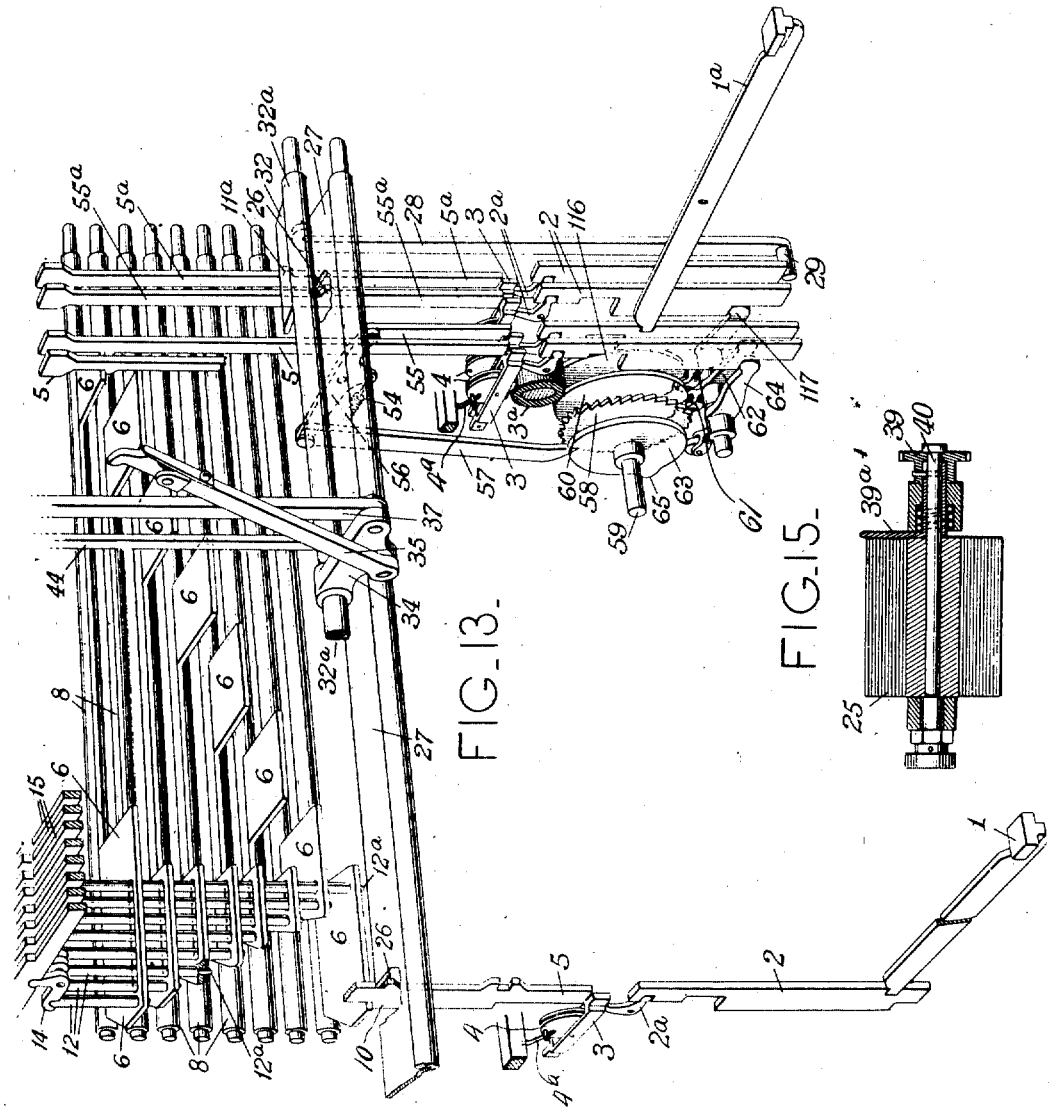
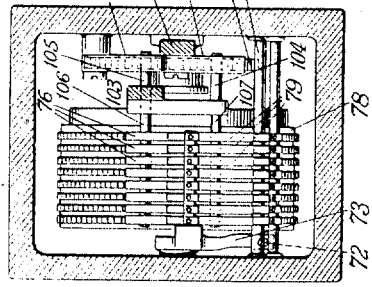

UNITED STATES PATENT OFFICE.

CARL MUEHLEISEN AND CHRISTIAN AUGUSTUS ALBRECHT, OF BERLIN, GERMANY, ASSIGNORS TO MERGENTHALER LINOTYPE COMPANY, A CORPORATION OF NEW YORK.

APPARATUS FOR PRODUCING PERFORATED STRIPS FOR CONTROLLING SELECTIVELY-OPERATED MACHINES.

1,251,407.

Specification of Letters Patent.  Patented Dec. 25, 1917.

Application filed October 6, 1916.  Serial No. 124,078.

*To all whom it may concern:*

Be it known that we, CARL MUEHLEISEN and CHRISTIAN AUGUSTUS ALBRECHT, citizens of the United States of America, and residing at No. 23 Chausseestrasse, Berlin, N. 4, in the Empire of Germany, have invented new and useful Improvements in or Relating to Apparatus for Producing Perforated Strips for Controlling Selectively-Operated Machines, of which the following is a specification.

In machines controlled by perforated strips, it has already been proposed to use strips having a pair of perforations for each operation to be performed, for example for depressing the key, for releasing a matrix, etc.; this, in order to provide for the performance of a large number of different operations by the various combinations of the said pairs of perforations with a comparatively small number of perforations.

The present invention relates to a machine for producing perforated strips similar to those above mentioned; it is operated by a keyboard and is so arranged that, by striking a key, two punches or perforators appertaining to that key, will be simultaneously released for making the respective pair of perforations. For producing strips suitable for controlling typographical composing machines, special means are provided for inserting by hand additional perforations other than those controlled from the keyboard, for indicating whether the line to be produced will be of full measure, that is to say whether the spaces provided for by the perforations, will suffice to effect a proper justification of the line or whether further special perforations are required which will release additional spaces to properly fill out the line.

The drawings illustrate, by way of example, one constructional form of the invention, and of these:—

Figure 3:
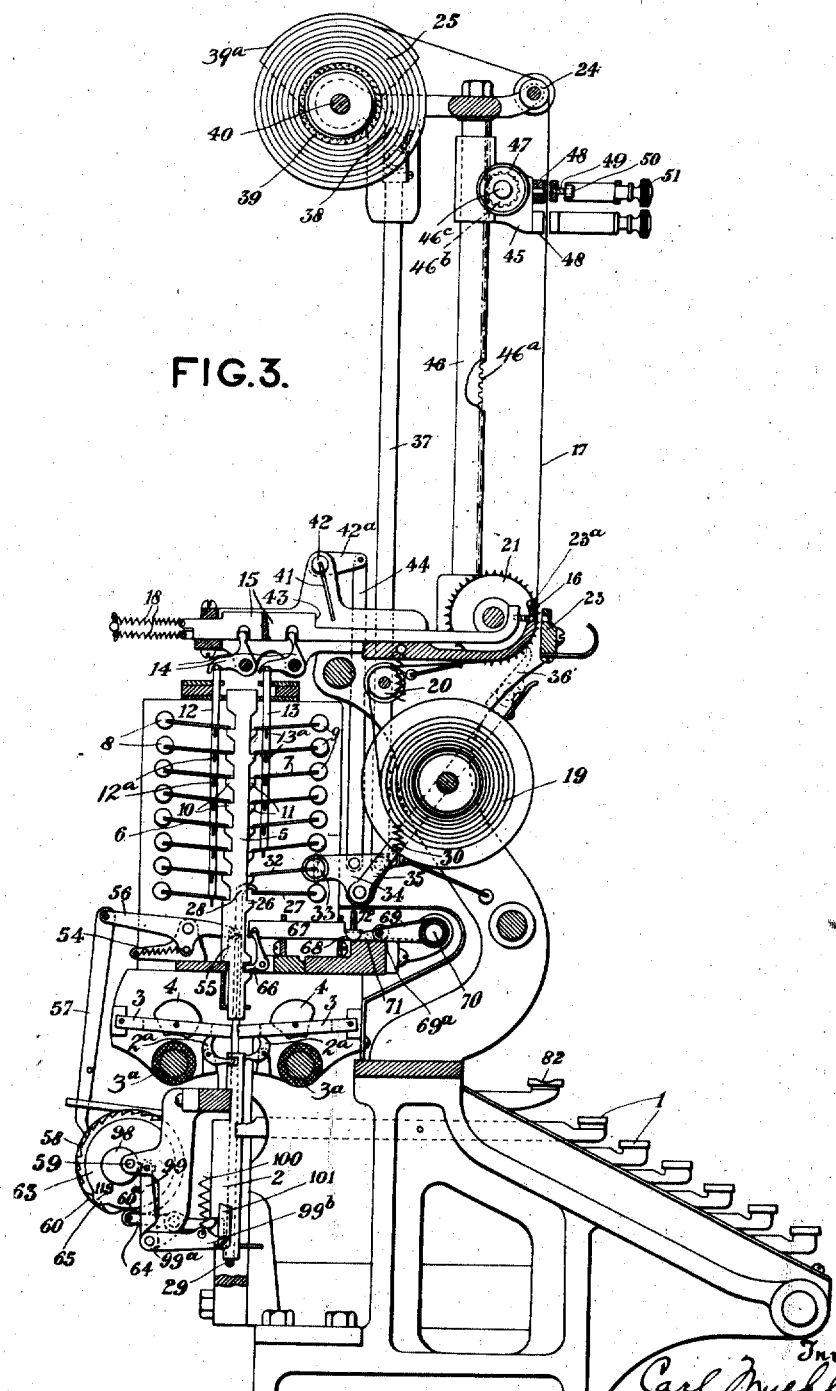
Fig. 3 is a side view, partly in section.

Fig. 4 is a horizontal section of part of Fig. 3 but drawn to a larger scale than is that figure, Fig. 5 is a vertical section through the counting mechanism, Figs. 6 and 7 are elevations of detached parts of the counting mechanism, Fig. 8 is a rear elevation of part of the mechanism, Figs. 9 to 12 are various views illustrative of the mechanism for the completion of the line, Fig. 13 is a perspective view of certain of the parts detached and showing in detail the connections between the keyboard and the punches or perforators controlled thereby, Fig. 14 is a section on the line 14—14 of Fig. 5, and Fig. 15 is a detail of the friction coupling between the strip reel and its advancing ratchet.

By depressing each of the keys 1, a key-rod 2 is raised and shifts the supporting dog $2^a$ to inactive position to effect the release of a cam carriage or yoke 3 carrying a cam 4 which is thereby caused to engage a continuously rotating roller $3^a$ and thereby rock the yoke 3 up and down, all in the manner well-known in connection with typographical composing machines as hitherto constructed or as shown and described in the Dodge U. S. Letters Patent No. 530,931. In other words, at their inner ends the yokes 3 are normally supported upon the pivoted dogs $2^a$ which hold them at such height as to maintain the cams 4 out of engagement with the rollers $3^a$, the cams in this position of the parts being held against rotary motion by their engagement with fixed stops $4^a$ on the framework. When, however, the dogs are moved, the cam yokes are tripped and allowed to drop, with the result that the cams are disengaged from the fixed stops and come into contact with one or the other of the rollers $3^a$, causing the cam yokes to be reciprocated in the usual manner. The rollers $3^a$ are provided with pulleys $3^b$ (see Fig. 8) which are driven from any suitable source of power. The free end of each yoke 3 engages the lower end of rod 5 so that each key depression will cause one of these rods to be raised. At the back and front of the rods 5, which are arranged side by side in a single row, are located rocking plates 6 and 7 respectively, whose respective shafts 8, 9 are pivotally mounted in the machine frame. The rods 5 are provided with projections or teeth 10, 11, underlying the rocking plates 6, 7, so that when one of such rods 5 is raised, the corresponding plates 6 or 7 will simultaneously be turned about its pivotal axis. For this purpose the rods 5 are made each with only one tooth 11 at a level peculiar to itself to engage the respective rocking plate 7 at the same level, as shown in Fig. 3, and the releasing rods 5 are further each provided with as many teeth 10 as there are rocking plates 6, in which case the rocking plates which are not to be actuated by a particular rod, have their edges interrupted so as to produce in effect recesses in their edges through which the respective teeth pass without contacting with or actuating the plates (see particularly Fig. 13).

In the constructional form represented, the keys are arranged in six tiers, each key of each tier, with the corresponding keys of the other tiers, forming what is herein termed a "group", so that there are sixteen groups in all. The system of perforations is devised so that one perforation is common to all the keys of a given tier and the second perforation of each pair is appropriated to a particular group. As the rocking plates 6 and 7 serve to control the perforating devices, as hereinafter explained, it is necessary that the same rocking plate 7 should be operated by the depression of all the keys of one and the same tier, and that the same rocking plate 6 should be operated by the depression of all the keys of one and the same group. Consequently all the rods 5 appertaining to the keys of the same tier, have their teeth 11 all at the same level to engage a given one of the plates 7 while the rods appertaining to the keys of the same group have their teeth 10 also arranged at the same level to engage one of the plates 6. For purposes of uniformity and the exigencies of manufacture, however, each of the rods 5 is provided with a full complement of teeth 10, this being permitted by the recessing or interruptions of the plates 6 which engage the teeth on rods of only one particular group, as above described. Further, there are provided sixteen rocking plates 6 each appropriate to a particular group, which may conveniently be arranged, as in the constructional form exemplified and as seen in Fig. 4 especially, in two series of eight, with the respective shafts extending over half the width of the keyboard and end to end. It will also be seen in Figs. 4 and 13 that the rocking plates 6 are of different lengths, each engaging with a certain number of releasing rods 5. As there are six keys for every rocking plate 6, corresponding to the six tiers of the keyboard, the extent of the engaging portion of each of those rocking plates corresponds with the space occupied by six adjacent rods 5.

With each of the rocking plates 6, 7 there is engaged a separate rod 12 or 13, by means of a projecting pin 12$^a$ or 13$^a$ on said rod entering a hole in the rocking plate. An upper rocking plate situated above one operated by a given rod 12 or 13 is provided with suitable openings, through which that rod may pass without affecting the said upper rocking plate.

The rods 12, 13 are arranged in two parallel banks those of each bank adjacent to each other and at about the same distance apart as that which is to separate adjacent perforations of transverse rows in the strip. Each of the rods 12, 13 engages the undersurface of a two-armed lever 14 which, in its turn, engages a horizontal pusher 15 (Fig. 3). When a rod 12 or 13 is raised, a punch 16 carried at the foremost end of the corresponding pusher 15, is moved forward and perforates the strip 17. As both a rod 12 and a rod 13 are always raised at the same time, two perforations are always correspondingly made in the strip. The return movement of each pusher 15 is effected by a spring 18.

In the foregoing construction, therefore, each of the rocking plates 6 is connected at its outer end to all of the rods 5 of one particular group and at its inner end to a single one of the rods 12 which operates the punches 16 of one set, it being noted that the longer plates 6 between their ends (see Fig. 13) are reduced or recessed to avoid engagement with the projecting teeth 10 of the rods of the intervening groups; while the rocking plates 7, which through the rods 13 operate the punches of the other set, are connected to the corresponding rods 5 in the several groups or those appertaining to the finger keys of the same tier, it being noted that such rods are provided with projecting teeth 11 only at the level of the particular plate with which they are engaged. As also described above, the overlying plates 6 and 7, at the places where the rods 12 and 13 are located, are cut away or provided with openings to provide clearance for such rods (Figs. 4 and 13) so that the rocking movement of a lower plate will be transmitted to its own particular rod without imparting movement to the other rods which are operated by the remaining plates.

According to the above arrangement, the punches or perforators 16 are divided into two sets, those of one set corresponding in number to that of the horizontal rows or tiers of keys and each connected to and operated by all of the keys of its respective tier, and those of the other set corresponding in number to that of the vertical rows or groups of keys, and each connected to and operated by all of the keys of its respective tier. Hence the depression of any one of the finger keys will result in the simultaneous operation of a pair of punches of the two sets irrespective of the location of the key in the keyboard, thus reducing materially the number of punches that is required to be employed in the perforation of the strips.

The strip 17 unwound from a supply spool or reel 19 passes over a guide roller 20 and thence to the perforating device. Two sprocket wheels 21, one on each side of the perforating device, engage perforations 22 near each edge of the strip 17 and serve to move the latter forward. During its journey past the perforating device the strip 17 passes between two plates 23, 23ᵃ which also act as guides for the punches. After leaving the plates 23 23ᵃ the strip travels upward to a guide roller 24 and thence to a receiving spool or reel 25.

Whenever a key 1 is depressed, the paper strip is moved forward to the extent of one tooth of the sprocket wheels 21, in the following manner: Each of the rods 5 has a projection or tooth 26 (Figs. 3, 5 and 13) which, when the said rod is raised, lifts up a rocking plate 27, which normally is at a short distance from the nose 26, so that the plate 27 is rocked shortly after the initial movement of the rod. The plate 27 when so raised, engages with the underside of a hook on the upper end of a rod 28 which, by means of a lateral projection 29, Figs. 3 and 13, engages the lower end of the adjoining one of the key rods 2, so that the latter is also raised and causes the corresponding cam 4 to come into operative contact with the respective cam roller 3ᵃ and to raise and lower the respective yoke 3. This yoke 3 in turn engages the lower end of the respective rod 5ᵃ which, by a tooth 11ᵃ, engages with the underside of a preferably narrow rocking plate 32 fixed to a rock shaft 32ᵃ, see Fig. 3 and particularly Figs. 4 and 13. The feeding forward of the strip is effected by the rocking plate 32, which, for this purpose, has operatively fast upon its shaft 32ᵃ a lever 34 which is connected to a spring 30 pulling upwardly thereon (Fig. 3). To the lever 34 is pivoted a bar 35 to whose upper extremity is pivoted a spring pressed pawl 36 which engages with the teeth of a ratchet wheel 31, Fig. 1, the movement of the bar 35 being such that, for each complete reciprocation, the sprocket wheels 21 will be turned to the extent of one tooth of the ratchet wheel 31.

Figure 1:
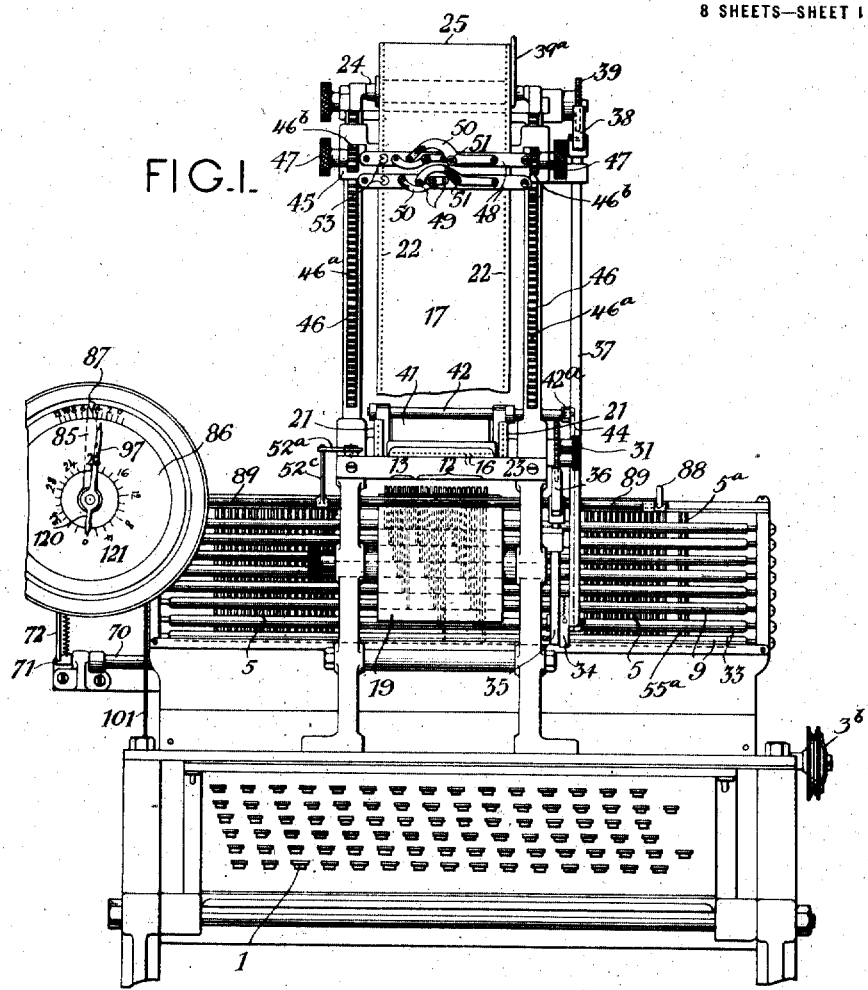
Figure 1 is a front elevation.

The ascent of the plate 32 moves the bar 35 downward and causes the pawl 36 to engage the next following tooth of the ratchet wheel 31, so that when the plate 32 is next released, the lever 34 is returned to its original position by the spring 30 and causes the sprocket wheels 21 to be correspondingly turned. In order to maintain the strip 17, at proper tension, a rod 37 is pivoted to the lever 34 which moves synchronously with the bar 35 and, by a pawl 38 pivoted thereto, engages a ratchet wheel 39 fast on the spindle 40 of the reel 25 (Figs. 1, 3 and 4). The reel 25 is loosely mounted upon its spindle 40 and is connected with the ratchet wheel 39 by a friction coupling comprising a spring-pressed flange 39ᵃ slidably connected to the boss of the ratchet wheel and pressed against the end of the reel (Fig. 15). The extent of rotation of the ratchet wheel 39, for each ascent of the bar 37, is such that the reel 25, even when there is scarcely any of the strip 17 upon it, will maintain the paper strip fully tensioned, the driving part of the friction coupling slipping past the driven part more or less according to the quantity of the strip which, at the time, may be present on the reel 25.

The delay occurring between the actuation of a key 1 and the resultant operation of the rocking plate 27 by reason of the lost motion between the latter and the rods 5, and the further delay occurring in the transmission of the movement from the keyrod 2 to the rocking plate 32 through the respective yoke 3, cam 4 and rod 5ᵃ is necessary in order to admit of the strip 17 remaining stationary during the projection and retraction of a punch 16 without the said strip being torn. In order to insure the return of the pushers 15 to normal position, a rocking plate 41 (Figs. 1 and 3) is pivoted in the machine frame by means of its shaft 42 and is adapted to engage with shoulders 43 formed on the said pushers. The rocking plate 41 normally occupies the position in which it is shown in Fig. 3, so that it will not impede the forward movement of the pushers 15 during the perforating operation. Upon the shaft 42 is secured a lever arm 42ᵃ which is connected with the before mentioned lever 34 through a link 44, so that the said plate will rock synchronously with the operation of the pawls 36, 38, and will thereby push into normal position any of the pushers 15 that may not have been withdrawn by its spring 18.

It is occasionally necessary, besides making the ordinary perforations, through striking the keys as before described, to make other perforations, such as would be required if the invention were to be applied to the control of a typographical composing machine, when a line contains an insufficient number of spaces to fill it out to properly justified measure. In such a case it would be necessary to insert quads or spaces in the spaces between adjacent words to subsequently obtain proper justification. As it is impossible to know, during the actual composition of a line, whether or not the insertion of such quads will be necessary, the perforations required for these quads can only be inserted after the composition of the line is finished. The operator may further require to form, by manual means, other perforations such for instance, as when a word or a line is to be omitted, i. e., to rectify or compensate for mistakes made during composition. In such a case a special perforation is made both at the beginning and at the end of the line to be cancelled, which will render inoperative the composing machine until such time as a second perforation effects a re-starting of the said machine.

In order to permit of the manual insertion of additional perforations as above mentioned, there is provided according to the present invention, a slide 45, Figs. 1 and 3, movable up and down guide rails 46; these latter have toothed racks 46$^a$ with which engage toothed wheels 46$^b$ the common shaft 46$^c$ of which is journaled in the slide 45 and can be manually rotated by means of milled heads 47, for raising and lowering the said slide. The slide carries one or more frames 48 (in the example illustrated there are two) through which passes the strip 17 and in which punches 49 are carried. As two perforations must always be made at each operation, the punches 49 are connected together in pairs each pair by a bridge 50, and each bridge can be pushed rearward by a knob or handle 51 to press the respective pair of punches through strip 17. In the constructional form represented, each of the two frames 48 is provided with two pairs of punches 49, so that in all, four additional pairs of perforations can be produced in the strip 17. For stopping and re-starting the composing machine one pair is used in each case, the other two pairs being employed for controlling the release of quads or spaces of respectively different set widths. This arrangement therefore constitutes in effect an auxiliary perforating apparatus which may be used to supplement the main apparatus or to produce perforations not provided for in the main keyboard or any other desired perforations.

As already stated, the quads or spaces must be inserted between adjacent words, i. e., at those places where the so-called spacebands are located. In order to be able to indicate without much difficulty, where these places are, means may be provided whereby the perforations appertaining to the spaces, are rendered readily distinguishable from the other perforations. In the present example this result is attained by an inking roller 52 (Fig. 2) movably mounted in front of the strip 17 and operatively connected with the space key mechanism (as will subsequently be described) in such manner that every time the said space key is depressed and a space perforation is made, the inking roller will be pressed against the strip to make thereon a colored impression, for instance a red indicator line or dot which will afterward serve for readily identifying the said perforation. When a number of quads or spaces are necessary to justify the line to full measure, the slide 45 is adjusted so as to bring pointers 53 thereon, into register with the above-named indicator, and one of the two pairs of punches appropriate to the quads is then manually pressed home so as to produce, at the very place where the space perforation is located, an additional perforation or perforations which will serve for the release of the required additional quads or spaces. The adjustment of the slide 45 for the production of perforations appropriate to the stopping and re-starting of the composing machine, is effected in the same manner as that last described.

At the end of each line, a perforation is produced by depressing a special key 1$^a$, which will afterward serve for controlling certain operations necessary on the completion of every line, for instance, in the case of composing machines, the raising of the assembler in order to send away the composed line to the casting mechanism and, in the case of typewriting machines, the movements of the paper carriage and platen. During the time occupied by this operation, the escapement or equivalent mechanism of the composing machine or the type actuating mechanism of a typewriting machine, as the case may be, must not be operated, because, in the case of composing machines, the assembler would not be in position to receive the released matrices, and in the case of a typewriting machine, the type would impinge on wrong parts of the sheet. For this reason the perforated strip must move onward without effecting any operation, to such an extent as will allow sufficient time for the assembler or paper carriage, as the case may be, to be restored to normal or starting position; in the case of composing machines, from say 16 to 18 advancements of the strip will usually suffice for this purpose. To feed forward the strip for the period mentioned above, when the perforation for sending the line away has been made, the mechanism next described and represented particularly in Figs. 3, 5, 8 to 13, is employed.

By the depression of the special key 1$^a$ at the end of the line, as is the case with the depression of the other keys during the setting up of the line, a rod 2 is raised and the respective cam 4 and yoke 3 are operated, this yoke engaging the under-surface of a rod 55 (Figs. 3 and 13) to the upper end of which is pivoted one arm of a two-armed lever 56 to whose other arm is pivoted a pawl 57 adapted to engage a ratchet wheel 58 (Figs. 3 and 8 to 13) fast upon a shaft 59. Each oscillation of the lever 56 will cause the ratchet wheel 58 to move forward one tooth. A spring 54 constantly tends to return the lever 56 to its normal position. Upon the shaft 59 there is also secured a cam 60 (Figs. 3, 10, 11, 12 and 13) against which bears a roller 61 carried in one end of a lever 62 which, at its opposite end, engages the under-surface of the respective key rod 2. The cam 60 is formed with a recess 60ª (Figs. 3, 9 and 12) in which the roller 61 rests when the device is inoperative. As soon as the rod 55, by the depression of the special key 1ª is raised, the ratchet wheel 58 and cam 60 are moved forward to the extent of one tooth of the former, and the lever 62 will consequently be rocked about its pivot and the rod 2 raised to effect the release of the respective cam 4 and a consequent further operation of the ratchet wheel 58. So long as the roller 61 has presented to it parts of the cam 60 of the larger diameter, so long will the rod 2 be maintained raised and the strip-actuating mechanism be operated due, of course, to the holding of the trip dog 2ª in its inactive position causing the repeated engagement of the cam 4 with the underlying continuously driven roller 3ª; in other words an intermittent movement of the shaft 59 will take place, and this shaft will have turned through 360 degrees before the roller 61 next enters the recess 60ª of the cam 60, to effect the release of the rod 2 and allow the connected trip dog 2ª to be restored to active position to arrest the yoke 3 in its normal position with the cam 4 out of engagement with the roller 3ª. Throughout this operation the strip 17 is moved forward step by step so that when it is afterward used for controlling a machine, the actual composing, typing or analogous initial operating-devices of that machine will remain inoperative for a corresponding period. For this purpose a further cam 116, Figs. 10, 11, 12 and 13 is secured on the shaft 59 and this operates a lever 117 the free end of which engages the under-surface of one of the rods 2. The cam 116 has two recesses 118, 119, and in the resting position, the recess 118 is in engagement with the roller of the lever 117. When the cam 116 rotates, the lever 117 is rocked and so long as its roller engages with the part of the cam's periphery which has the larger radius, the respective rod 2 will remain raised. This rod 2, in the manner previously described in connection with the key-rods 2, effects the actuation of a rod 55ª which is provided with only one tooth 26 and consequently each time it is raised, it will raise the rocking plate 27 and effect the movement forward of the strip in the manner hereinbefore described.

The perforation for controlling the sending away of the composed line or controlling or effecting another correspondingly periodic operation, is produced by a cam 63 during the rotation of the shaft 59 on which said cam is secured. This cam 63 has a protruding nose 65 which coöperates with a lever 64 pivoted co-axially with the levers 62 and 117. When the shaft 59, during its rotation, and, through the nose 65 of the cam 63 causes the lever 64 to turn about its pivot, the free end of this lever, which engages beneath a shoulder of one of the rods 2, raises the latter, and through it, in the known manner, effects the release of the respective cam 4, so that the yoke 3 of that cam, will raise the respective rod 5 which, in the manner previously described, will produce a special perforation in the strip 17. The normal position of the nose 65 of the cam 63 is such that the said nose does not become operative until after the shaft 59 has made a part of a rotation, and consequently the perforation resulting from this operation does not follow closely upon the perforation resulting from the actuation of the key last previously struck, so that a space intervenes between said perforations and when, afterward, the strip is used to control a composing machine, or a typewriting or other machine, the last matrix released, or the last type-bar actuated has time respectively to reach the assembler or to return to its normal position before, in the composing machine, the line is sent away, and, in the typewriting machine, the paper carriage has been adjusted for the start of a new line. The angular position of the nose 65, on the shaft 59, coincides with that of the recess 119 of cam 116.

In order to enable the operator to ascertain on every possible occasion what space is left in the line and whether the spaces introduced into that line are sufficient to insure its proper justification, the following means have been devised:

Each of the rods 5 is connected with an angle lever 66 (Figs. 3 and 5) pivotally engaging a pusher 67 having at its foremost end a tongue 68. The thickness of these tongues for different rods 5, varies according to the thickness of the matrices and spaces respectively appertaining thereto, and is proportionate thereto. When a pusher 67 is moved by its lever 66, the respective tongue engages beneath a roller 69ª pivotally mounted between two arms 69 (Figs. 4 and 5) so that a rocking shaft 70 to which these arms are secured, is turned to a smaller or greater extent according to the thickness of the particular tongue at the time projected beneath the roller 69ª. On one end of the rocking shaft 70 there is secured an arm 71 on which rests a rod 72 whose upper end engages the under-surface of one arm of an angle lever 73 (Figs. 5 and 6) which is free to oscillate upon a pivot 74. The other arm of lever 73 carries a stud 75 upon which are pivoted one or more spring-actuated escapement pawls 76. The escapement pawls engage a ratchet wheel 78 fast to a spindle 77 and formed with very fine teeth so that every time the rod 72 is raised, the ratchet wheel 78 is moved forward. By the means previously described, the rod 72 is moved upward to a smaller or greater extent according to whether thin or thick matrices are being set, and, in order to insure that the said variations in the movement of the rod 72 may be transmitted to the ratchet wheel 78, even if such a movement does not amount to a whole tooth, the pawls 76, when a plurality are provided, have their engaging ends successively advanced a fraction of the width of one tooth each relatively to another (Fig. 14), and the ratchet wheel is then preferably constructed as a toothed drum in which all the pawls can engage; thus the movement to the extent of even a fraction of a tooth will bring one or other of the pawls into operation. The extent of the angular movement of the lever arm 69 which, as before explained, is governed by the thickness of the matrices, must be accurately or proportionally transmitted to the ratchet wheel 78. One or more detents 79 are used to temporarily lock the ratchet wheel 78 in its adjusted position and the forward movement of the said ratchet wheel takes place against the influence of a spring or weight. In the constructional form exemplified, the weight 80 is represented, which is attached to one end of a cord 81 whose other end is operatively fast to the ratchet wheel which, in turn, is rigidly secured on the spindle 77. On the forward end of the spindle 77, is secured an index or pointer 97 which moves in front of a dial 86, Figs. 1 and 5, bearing a scale graduated, in accordance with the type of machine, from zero to the number which constitutes the maximum for that particular machine; in the case of composing machines for instance, ciceros may be indicated on the dial 86, from zero to say 36, there being few if any composing machines now used which deal with lines exceeding 36 ciceros. The records of the measurements need not actually equal those in the line set, but may be proportional thereto.

When the space key 82 is struck, see particularly Fig. 5, a tongue 68 is moved forward by the rod 5 appertaining to that key and the thickness of this tongue will correspond to the unexpanded thickness of the respective wedge spacer at its thinner end, so that the pointer 97 will indicate the total measure of the matrices and spacebands included in the line, the latter in their unjustifying condition.

Figure 2:
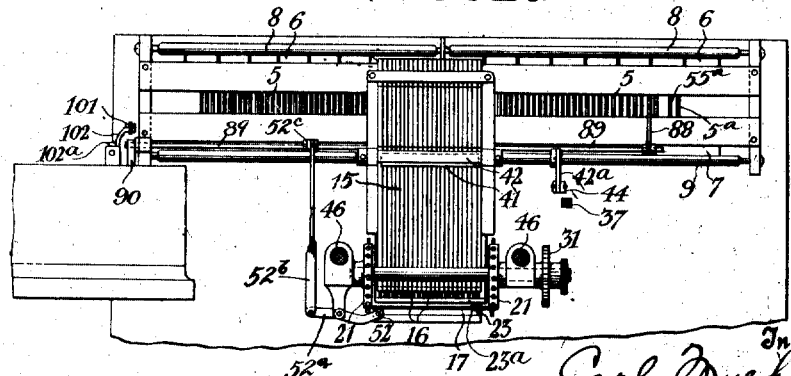
Fig. 2 is a sectional plan of part thereof.

The space key 82, like the keys 1, is connected to one of the rods 2 and will, through the respective rod 5, turn a lever 88 (Fig. 5) which, at one end, is fast to a rock shaft 89 and, at its other end rests upon the said rod, and the motion thereby imparted to the rock shaft, will be transmitted through a lever arm 90, link 91, and lever arm 92ª, to a rock-shaft 92 on which the last-named arm is fast (see also Figs. 2 and 7). Upon this rock shaft 92 is secured a bell-crank lever 93 to one arm of which is pivoted a pawl 93ª engaging a ratchet-toothed segment 94. Each time the space key is depressed, the segment 94, through the lever 93 and pawl 93ª, is moved forward to the extent of one tooth. A detent 95 holds the segment in position after each operation by the pawl 93ª, and a spring 96 serves to return the said pawl to its starting position after it has operated the segment. The segment 94 is fast to a hollow shaft 83 which is free to turn upon, and independently of, the spindle 77, and has rigidly secured to its forward extremity, an arm 85, terminating at its free end, in an index or pointer 87 movable in front of the dial 86.

The pointer 87 turns in the direction opposite to that in which the pointer 97 turns, and each time the space-key 82 is struck, the pointer 87 will move a distance equal to, or indicative of, the justifying capacity of one spaceband. When the composition of a line is about to be commenced, the pointer 97 registers with the number of its scale which corresponds to the total length of the line required, thus when setting a line of 24 ciceros, for instance, the pointer will appear over the number "24," whereas the pointer 87 will be at the zero of its scale. As and when matrices and spaces are composed, the pointer 97 will move away from the number 24 in this selected example, and the number upon which it will temporarily stop, will show the number of ciceros that can still be introduced into the line, to fill it out to full measure, and the position of the pointer 87 on its scale, will indicate the number of ciceros which, when justification takes place, will be filled out by the expansion of the spacebands. When the pointers register each with the other, the line is so full that justification will expand it to full measure; at such a juncture it would still be possible to add to the line a few more matrices, but the spacebands would not then expand to their full capacity. The composition must not be discontinued before the pointers 87, 97 mutually register because, under those circumstances a proper justification could not be secured. If the composition of the line cannot be stopped when the pointers 87, 97 register with each other, owing to the presence at the end of that line, of a long word which cannot be divided or for any other reason, quads must be introduced into the line in the manner previously described, and the space between the two pointers will show how many ciceros are to be filled out by the quads.

After the composition of a line the pointers are returned to their respective normal positions, through the instrumentality of an eccentric 98 (Figs. 3, 5 and 8) secured upon the shaft 59, and a lever arm 99 which, through its anti-friction roller, is in operative engagement with the said eccentric. The arm 99 is fast upon a rock shaft 99ª on which is also fast another arm 99ᵇ. The lever 99 is held in constant operative engagement with the eccentric 98 by a spring 100, and the arm 99ᵇ is pivoted to the lower end of a link or rod 101 whose upper end is similarly connected to a lever arm 102, fast on a rock shaft 102ª. On this shaft 102ª there is also rigidly secured an arm 102ᵇ, Fig. 7, pivoted to the upper end of a sliding rod 103 provided with pins 104, 105, 106, 107 engaging with the under-surface of the pawls 93ª, 95, 76 and 79 respectively (see also Fig. 14). When, through the rotation of the eccentric 98, the link 101 is moved downward, and the rod 103 is raised, the just-named pawls are disengaged from the ratchet wheel 78 and segment 94, so that, under the action of the weight 80 and spring 108 respectively, they are returned to their respective normal positions.

The pointer 97 must be temporarily adjusted for each different length of line required, and, for that purpose, the spindle 77 has secured to its rear end an abutment blade 109 Figs. 5 and 8, which bears against a stop 110 and thereby serves to limit the backward movement of the said pointer. The stop 110 is provided with a dove-tailed head or block 111 (Fig. 5) which can be adjusted to any desired position in a dove-tailed circular groove 112 concentric with the spindle 77 and secured in any such position by a clamping nut 113.

The pointer 97 may be formed with an extension 120 Figs. 1 and 5, adapted to coöperate with a special scale 121 (Fig. 1) graduated in ciceros and corresponding with the divisions on the outer edge of the dial 86, with which the pointer 87 coöperates, so that the pointer 120 will constantly show on the scale 121 the total set width of the matrices already set. The scale 121 serves to constantly keep before the eyes of the operator the length of the line which yet remains to be set, so that, when nearing the end of the line, he will be better able to decide whether or not there is accommodation for another word or syllable to be set in it.

Referring now to the inking roller 52 before mentioned, it will be noted that it is carried at the free end of a horizontal pivoted lever 52ª which is connected at its other end to a link 52ᵇ extending forwardly from a vertical arm 52ᶜ rising from the transverse rock shaft 89, (see Figs. 1 and 2). As a result, when the arm 88 is rocked upwardly by the actuation of the space key 82, the arm 52ᶜ is turned forwardly and the lever 52ª rocked about its pivot to press the inking roller 52 against the perforated strip 17, as required.

The operation of the device may be described as follows:

For producing the perforations of the individual characters or similar elements of a line, the keys 1 are depressed in the ordinary well-known manner, and at each such depression a pair of perforations are produced in the strip 17 by the punches 16, and the strip, is moved forward one step. Between adjacent words, perforations are formed for the spaces, by depressing the space-key 82. If the strip 17 is required for composing machines, the perforations last mentioned will serve to release spacebands which afterward secure the justification of the line. Both the matrices and the spaces set, will be recorded on the dial 86 by the pointers 97 and 87, respectively, so that at all times the operator can determine whether or not the line is full. When the pointers 87, 97, register with each other the operator will discontinue the setting, but if, at the termination of the line, the pointers have not yet mutually registered, he will, at the places where the space perforations appear, manually produce special quad perforations. When the line is completed the operator depresses the final or special key 1ª so that the shaft 59 is caused to make a complete rotation, and the cam 116 will move the strip forward uninterruptedly without any perforation being made therein until the spindle 59 has completed the said rotation; in other words, the strip will be propelled onward a number of steps equal to the number of teeth of the ratchet wheel 58. The strip 17 will consequently present a long blank space and when the strip is subsequently introduced into the pattern controlled machine to be controlled by it, the respective organs of that machine will remain idle during the time occupied by the passage of the said blank space. During this interval the raising of the assembler, in the case of a composing machine, or the return of the paper carriage in a type writing machine, will take place. The device for the raising of the assembler or the return of the paper carriage is then controlled by the cam 63 through the respective strip-perforation, this perforation being located within the said blank space and preferably at a little distance to the rear of the perforation appertaining to the last component part of the line, so that the line will be completed before the assembler or paper carriage is moved. When the shaft 59 has completed its rotation, the operator may begin a fresh line. In the meantime, the pointers 87, 97 through the action of the eccentric 98 will have been returned to their respective original positions.

Having described our invention, we claim and desire to secure by Letters Patent:—

1. In apparatus for producing perforated strips, the combination with keys arranged in a plurality of tiers and in a plurality of groups each group comprising keys belonging to respectively different tiers, and a plurality of punches for producing the perforations, of a plurality of rocking plates one appropriated to each of the tiers of keys and to one of the punches and another appropriated to each of the groups of keys and to another of the punches, and means intermediate the keys and the rocking plates, adapted to rock a different duality of such plates and actuate a different duality of punches for each key operated.

2. In apparatus for producing perforated strips, the combination with a punch for producing perforations in the strip, a key controlling the operation of the punch, and means comprising a movable rod controlled by the key and intermediate the key and punch, adapted to operate the latter, of a tooth on the rod, a rocking plate adapted to be engaged by the tooth and mechanism controlled by the plate operative to intermittently propel the strip, the said tooth normally being at a distance from the plate so that only part of the movement of said tooth is transmitted to the rocking plate.

3. In apparatus for producing perforated strips, the combination with a punch for producing perforations in the strip, a key controlling the operation of the punch, and means comprising a movable rod controlled by the key and intermediate the key and punch, adapted to operate the latter, of a tooth on the rod, a rocking plate adapted to be engaged by the tooth which is normally at a distance from the plate, and mechanism controlled by the plate operative to intermittently propel the strip, said mechanism comprising a motion-delaying device so that during only part of the operation of the key will the strip be propelled.

4. In apparatus for producing perforated strips, the combination with a punch for producing perforations in the strip, a key controlling the operation of the punch, and mechanism controlled by the key operative to intermittently propel the strip, of devices operatively connected with the said mechanism positively withdrawing the punch from the strip.

5. In apparatus for producing perforated strips, the combination with a punch for producing perforations in the strip, a key controlling the operation of the punch, a reel receiving the perforated strip and mechanism controlled by the key operative to intermittently turn the reel, of a friction coupling between the said mechanism and reel, said coupling including a flange rotated by said mechanism and yieldingly engaged with the reel for turning the same.

6. In an apparatus for producing perforated strips, the combination with a punch for producing perforations in the strip, a key controlling the operation of the punch, a reel receiving the perforated strip, mechanism controlled by the key for intermittently turning the reel, said mechanism including a ratchet wheel rotatable relatively to the reel and a member movable with the ratchet wheel and frictionally engaging the reel with spring pressure.

7. In apparatus for producing perforated strips, the combination with a punch for producing perforations in the strip, a die for supporting the strip during the perforation, and a reel for receiving the perforated strip, of a guide for the strip intermediate the die and the reel and at such distance from the former as to leave a stretch of the perforated strip exposed for inspection and correction.

8. In apparatus for producing perforated strips, the combination with a punch for producing perforations in the strip, a die for supporting the strip during the perforation, and a reel for receiving the perforated strip, of a guide for the strip intermediate the die and the reel and at such distance from the former as to leave a stretch of the perforated strip exposed for inspection and correction, and a manual strip-perforating device movable along the exposed stretch of the perforated strip for enabling perforations to be added by hand to the already mechanically perforated strip.

9. In an apparatus for producing perforated strips, the combination of a series of punches for producing perforations in the strip, a keyboard comprising a series of character keys and a spacer key for operating the punches, and a strip marker controlled by the spacer key and independent of the character keys and adapted to make on the strip distinguishing marks adjacent the perforations made by the corresponding punch.

10. In apparatus for producing perforated strips, the combination with a punch for producing perforations in the strip, and a key controlling the operation of the punch, of a special key and mechanism controlled by the special key operative to propel the strip in a continuous succession of steps for each actuation of the key without operating the punch.

11. In apparatus for producing perforated strips, the combination with a punch for producing perforations in the strip, devices operative to feed forward the strip stepwise, and a key controlling the operations of the punch, of a reciprocating pawl controlled by the same key, a ratchet wheel engaged by the pawl and mechanism intermediate the pawl and ratchet wheel operative to impart to the pawl a continuous succession of reciprocations for each actuation of the key, and mechanism intermediate the ratchet wheel and the strip-feed devices operative to correspondingly propel the strip in a continuous succession of steps.

12. In apparatus for producing perforated strips, the combination with a punch for producing perforations in the strip, devices operative to feed forward the strip stepwise, and a key controlling the operations of the punch, of a normally inoperative reciprocating pawl brought into operation by the actuation of the same key, a ratchet wheel turned by the pawl, a cam fast to the ratchet wheel and intermediate it and the pawl, and operative to maintain the pawl uninterruptedly in engagement with a succession of teeth of the ratchet wheel, and mechanism intermediate the ratchet-wheel and the strip-feed devices operative to correspondingly propel the strip in a continuous succession of steps.

13. In apparatus for producing perforated strips, the combination with a punch for producing perforations in the strip, of mechanism controlled by a key operative to successively propel the strip stepwise, arrest the strip, advance and retract the punch during the arrest of the strip, propel the strip in a continuous succession of steps and again arrest the strip for each actuation of the key.

14. In apparatus for producing perforated strips, the combination with a continuously rotating roller and a normally-inoperative member adapted, when released, to engage and be oscillated by the rotating roller, of a wheel intermittently moved angularly by the member when the latter is oscillated, a key controlling the release of the member, and a cam fast to the wheel adapted to maintain the member in engagement with and to disengage it from the roller.

15. In apparatus for producing perforated strips, the combination with a continuously rotating roller and a normally-inoperative member adapted, when released, to engage and be oscillated by the rotating roller, of a wheel intermittently moved angularly by the member when the latter is oscillated, a key controlling the release of the member, mechanism operative to intermittently propel the strip, a second normally-inoperative member adapted, when released, to be oscillated by a continuously rotating roller and actuate the strip-propelling mechanism, and a cam fast to the wheel adapted to effect the release of the said second member.

16. In apparatus for producing perforated strips, the combination with a continuously rotating roller and a normally-inoperative member adapted, when released, to engage and be oscillated by the rotating roller, of a wheel intermittently moved angularly by the member when the latter is oscillated, a key controlling the release of the member, mechanism operative to intermittently propel the strip, a second normally-inoperative member adapted, when released, to be oscillated by a continuously rotating roller and actuate the strip-propelling mechanism, and a multiphase cam fast to the wheel, adapted to effect, for each actuation of a key, successive engagements and disengagements of the said second member with the roller and consequent successive periods of movement and rest of the strip.

17. In apparatus for producing perforated strips, the combination with a continuously rotating roller and a normally-inoperative member adapted, when released, to engage and be oscillated by the rotating roller, of a wheel intermittently moved angularly by the member when the latter is oscillated, a key controlling the release of the member, a punch adapted to perforate the strip, mechanism adapted to reciprocate the punch, a second normally-inoperative member adapted, when released, to be oscillated by a continuously rotating roller and actuate the punch-reciprocating mechanism, and a cam fast to the wheel adapted to effect the release of the said second member.

18. In apparatus for producing perforated strips, the combination with a continuously rotating roller and a normally-inoperative member adapted, when released, to engage and be oscillated by the rotating roller, of a wheel intermittently moved angularly by the member when the latter is oscillated, a key controlling the release of the member, mechanism operative to intermittently propel the strip, a punch adapted to perforate the strip, mechanism adapted to reciprocate the punch, further normally-inoperative members adapted, when released, to be oscillated by a continuously rotating roller and actuate respectively and in alternation the strip-propelling mechanism and punch-reciprocating mechanism, and cams fast to the wheel adapted to release in alternation the said further members.

19. In apparatus for producing perforated strips, the combination with a plurality of keys each representative of a particular typographical element to be composed in a line, a plurality of punches producing the perforations, and means intermediate the keys and punches adapted to operate the latter, of tongues operating with the punches and representative of the set-width of the respective elements, and indicator mechanism actuated by said tongues totalizing the set-width of a plurality of such elements.

20. In apparatus for producing perforated strips, the combination with a plurality of keys each representative of a particular typographical element to be composed in a line, a plurality of punches producing the perforations, and means intermediate the keys and punches adapted to operate the latter, of tongues operating with the punches and representative of the set-width of the respective elements, pawls rocked to extents varying with the respective tongues, a ratchet drum engaged by the pawls at different angular positions around its axis, and an index or pointer operatively fast to the drum and moving relatively to a scale to indicate the set-width of the elements composed in a line.

21. In apparatus for producing perforated strips, the combination with a key representative of each expansible spacer to be composed in a line of typographical matter, a punch producing a perforation, and means intermediate the key and punch adapted to operate the latter, of tongues operating with the punch and representative of the fully-expanded set-width of the spacers, and indicator mechanism indicating the total expansive capacity of all the spacers composed in the line.

22. In apparatus for producing perforated strips, the combination with a plurality of keys each representative of a particular typographical element to be composed in a line, a plurality of punches producing the perforations, and means intermediate the keys and punches adapted to operate the latter, of tongues operating with the punches and representative of the set-width of the respective elements, indicator mechanism actuated by said tongues totalizing the set-width of a plurality of such elements, a key representative of each expansible spacer to be composed in the line, a punch producing a perforation representative of a spacer, means intermediate the said key and punch adapted to operate the latter, tongues operating with the punch and representative of the fully-expanded set-width of the spacers, and mechanism indicating the total expansive capacity of all the spacers composed in the line.

23. In apparatus for producing perforated strips, the combination of a plurality of keys each representative of a particular element to be composed in a line, a plurality of punches producing the perforations, means intermediate the keys and punches adapted to operate the latter, tongues operating with the punches and representative of the set-width of the respective element, pawls rocked to extents varying with the respective tongues, a ratchet drum engaged by the pawls, an index or pointer operatively fast to the drum and moving relatively to a scale, a continuously rotating roller, a normally-inoperataive member adapted, when released, to engage and be oscillated by the rotating roller, a wheel intermittently moved angularly by the reciprocating member, a key controlling the release of the member, and a cam fast to the wheel adapted to disengage the pawls from the ratchet drum, and a weight or spring adapted to turn the drum when the pawls are thus disengaged.

24. In apparatus for producing perforated strips, the combination with a plurality of keys each representative of a particular typographical element to be composed in a line, a plurality of punches producing the perforations, and means intermediate the keys and punches adapted to operate the latter, of tongues operating with the punches and representative of the set-width of the respective elements, indicator mechanism actuated by said tongues totalizing the set-width of a plurality of such elements, and means adapted to adjust the last-named mechanism to correspond with lines of different length.

25. In apparatus for producing perforated strips, the combination with a plurality of keys each representative of a particular typographical element to be composed in a line, a plurality of punches producing the perforations, and means intermediate the keys and punches adapted to operate the latter, of tongues operating with the punches and representative of the set-width of the respective elements, an index or pointer actuated by said tongues totalizing the set-width of a plurality of such elements, a spring arm fast to the said index or pointer and a stop adjustable in the path of the spring arm.

26. In apparatus for producing perforated strips, the combination with a plurality of keys each representative of a particular typographical element to be composed in a line, a plurality of punches producing the perforations, and means intermediate the keys and punches adapted to operate the latter, of tongues operating with the punches and representative of the set-width of the respective elements, pawls rocked to extents varying with the respective tongues, a ratchet drum engaged by the pawls at different angular positions around its axis, an index or pointer operatively fast to the drum and moving relatively to a scale to indicate the set-width of the elements composed in a line, and a second index or pointer also fast to the drum and moving relatively to a scale 27. In an apparatus for producing perforted strips, the combination of a series of finger keys, a corresponding series of power-actuated rods controlled thereby and divided into groups, a set of punches, one for each group, and each operatively connected to all of the rods of the corresponding group, and a second set of punches, one for each rod of an individual group, and each operatively connected to the corresponding rods of all the groups.

28. In an apparatus for producing perforated strips, the combination of a series of finger keys, a corresponding series of power-actuated rods controlled thereby and divided into groups, a set of punches, one for each group of rods, a second set of punches, one for each rod of an individual group, and two banks of rocking plates, those of one bank establishing operative connection between all of the rods of each group and the corresponding punch of the appropriate set, and those of the other bank establishing operative connection between the corresponding rods of the several groups and the common punch of their appropriate set.

29. In an apparatus for producing perforated strips, the combination of a series of finger keys, a corresponding series of power-actuated rods controlled thereby, a series of punches less in number than that of the rods, and operative connections between the rods and the punches.

30. In an apparatus for producing perforated strips, the combination of a series of punches, finger keys controlling the operation thereof, and means operated by the finger keys for positively restoring the punches to normal position after operation.

31. In an apparatus for producing perforated strips, the combination of a series of power-actuated punches, finger keys controlling the operation thereof, and means operated by the finger keys for positively restoring the punches to normal position after operation, the said means including motion-delaying devices to allow the punches to complete their normal operation before they are thus positively restored.

32. In an apparatus for producing perforated strips, the combination of a plurality of punches, a series of key-controlled power-actuated rods for operating the punches, and mechanism for positively restoring the punches to their normal position after operation, the said mechanism including a movable device to engage the punches, power-actuated means for operating said device, and connections from the key-controlled rods for initiating the operation of said power-actuated means.

33. In an apparatus for producing perforated strips, the combination of a plurality of punches, a series of key-controlled power-actuated rods for operating the punches, and strip feeding mechanism including a rocking plate adapted to be engaged and operated by all of the rods, the said rods and plates being relatively constructed to permit lost motion between them, for the purpose described.

34. In an apparatus for producing perforated strips, the combination of a plurality of punches, a series of key-controlled power-actuated rods for operating the punches, and strip feeding mechanism including a reciprocating pawl, power-actuated means, normally inactive, for reciprocating the pawl, and a rocking plate adapted to be engaged by all of the key-controlled rods and connected to the power-actuated means to initiate the operation thereof.

35. In an apparatus for producing perforated strips, the combination of a plurality of punches, a series of key-controlled power-actuated rods for operating the punches, and strip feeding mechanism including a reciprocating pawl, a spring for effecting the advancing movement thereof, power-actuated means, normally inactive, for effecting the retracting movement of the pawl, and connections from the key-controlled rods to initiate the operation of said power-actuated means.

36. In an apparatus for producing perforated strips, the combination with a plurality of punches, a keyboard controlling the operation thereof, a pair of pinwheels for feeding the strip forward, and a reel on which the strip is wound, of pawl-and-ratchet mechanism for rotating the pinwheels, separate pawl-and-ratchet mechanism for rotating the winding reel, an operating device controlled by the keyboard, and independent connections between said device and the two pawl-and-ratchet mechanisms.

37. In an apparatus for producing perforated strips, the combination of mechanism for feeding the strip therethrough, a main series of punches acting upon the strip, and manually operated supplemental punches for producing additional perforations in the strip after it has passed beyond the main punches.

38. In an apparatus for producing perforated strips, the combination of mechanism for feeding the strip therethrough, a main series of power-actuated punches, a main keyboard controlling the operation of said punches, and an auxiliary perforating apparatus for producing in the strip perforations unprovided for by the main keyboard and the main series of punches controlled thereby.

39. In an apparatus for producing perforated strips, the combination of a series of key-controlled power-actuated punches, mechanism for feeding the strip past the punches, a guide frame through which the strip passes after it has been subjected to the action of the key-controlled punches, and supplemental punches carried by the guide frame for producing further perforations in the strip at will.

40. In an apparatus for producing perforated strips, the combination of a series of key-controlled power-actuated punches, mechanism for feeding the strip past the punches, a guide frame through which the strip passes after it has been subjected to the action of the key-controlled punches, supplemental punches carried by the guide frame for producing further perforations in the strip at will, and means whereby the guide frame may be adjusted to different operative positions to locate the supplemental punches at different points along the surface of the strip.

41. In an apparatus for producing perforated strips, the combination of a series of punches for producing perforations in the strip, a keyboard controlling the operation of the punches and comprising a spacer key for operating one of the punches, a strip marker controlled by the spacer key and adapted to mark on the strip a distinguishing mark adjacent the perforation made by the corresponding punch, and an auxiliary apparatus arranged to produce further perforations in the strip at the places indicated by the strip marker.

42. In an apparatus for producing perforated strips, the combination of a plurality of punches, finger keys controlling the operation thereof, mechanism for propelling the strip step by step as the respective finger keys are actuated, and an additional finger key operative to cause said mechanism to impart to the strip a plurality of step-by-step movements at each actuation of said additional key and without operating the punches.

43. In an apparatus for producing perforated strips, the combination of a plurality of punches, finger keys controlling the operation thereof, mechanism for propelling the strip step by step as the respective finger keys are actuated, an additional finger key operative to cause said mechanism to impart to the strip a plurality of step-by-step movements at each actuation of said additional key, and a further punch controlled by the additional key and acting upon the strip after it has completed a predetermined number of its step-by-step movements caused by the additional key.

44. In an apparatus for producing perforated strips, the combination with a plurality of punches, finger keys controlling the operation thereof, and strip feeding devices operative to advance the strip step by step as the respective keys are actuated, of an additional punch for producing perforations in the strip at the end of a line, a special finger key controlling the operation of said punch, and means for delaying operation of the punch when the key is actuated to permit the strip to be advanced a plurality of steps to establish an interval between the perforation produced by the punch and the perforations made by the other punches.

45. In an apparatus for producing perforated strips, the combination with a plurality of punches, finger keys controlling the operation thereof, and strip feeding devices operative to advance the strip step by step as the respective keys are actuated, of an additional punch, a special finger key controlling the operation thereof, and means controlled by said key to impart a plurality of impulses to the strip feeding devices and then to operate the punch.

46. In an apparatus for producing perforated strips, the combination with a plurality of punches, finger keys controlling the operation thereof, and strip feeding devices operative to advance the strip step by step as the respective keys are actuated, of an additional punch, a special finger key controlling the operation thereof, and means controlled by said key and operative at each cycle of operation to impart a plurality of impulses to the strip feeding devices and allow them to come to rest momentarily, then to operate the punch while the strip feeding devices are momentarily at rest, and finally to impart a further plurality of impulses to the strip feeding devices after the operation of the punch is completed.

47. In an apparatus for producing perforated strips, the combination of a plurality of punches, a keyboard controlling the operation thereof and comprising regular character keys and a spacer key, an indicator controlled by said keys and comprising two pointers movable in opposite directions, one actuated by the spacer key and the other by the character keys, and graduated scales associated with the respective pointers.

In witness whereof we have hereunto set our hands in the presence of two witnesses.

CARL MUEHLEISEN.
CHRISTIAN AUGUSTUS ALBRECHT.

Witnesses:
HENRY HASPER,
ALLEN F. JENNINGS.